United States Patent [19]

Meador et al.

[11] 4,319,191

[45] Mar. 9, 1982

[54] DIELECTRIC WELL LOGGING WITH RADIALLY ORIENTED COILS

[75] Inventors: Richard A. Meador, Spring, Tex.; Theodore W. Nussbaum, Harahan, La.

[73] Assignee: Texaco Inc., White Plains, N.Y.

[21] Appl. No.: 110,967

[22] Filed: Jan. 10, 1980

[51] Int. Cl.³ .................. G01V 3/30; H01F 15/04
[52] U.S. Cl. .................. 324/341; 324/338; 336/84 C
[58] Field of Search .............. 324/338, 339, 341, 346, 324/343; 336/84 R, 84 C

[56] References Cited

U.S. PATENT DOCUMENTS

| | | | |
|---|---|---|---|
| 2,359,894 | 10/1944 | Brown et al. | 324/346 |
| 3,014,177 | 12/1961 | Hungerford et al. | 324/339 X |
| 3,094,658 | 6/1963 | Bravenec et al. | 324/339 |
| 3,187,252 | 6/1965 | Hungerford | 324/343 |
| 4,107,598 | 8/1978 | Meador et al. | 324/341 |

FOREIGN PATENT DOCUMENTS

| | | | |
|---|---|---|---|
| 227951 | 10/1968 | U.S.S.R. | 324/339 |
| 280698 | 9/1970 | U.S.S.R. | 324/339 |
| 648928 | 2/1979 | U.S.S.R. | 324/343 |

*Primary Examiner*—Gerard R. Strecker
*Attorney, Agent, or Firm*—Carl G. Ries; Robert A. Kulason; Jack H. Park

[57] ABSTRACT

A dielectric well logging system has its coils aligned radially, rather than in alignment, with respect to the longitudinal axis of a sonde which moves the coils through a borehole. Improved shielding is also provided. The coils have different and improved response characteristics.

3 Claims, 5 Drawing Figures

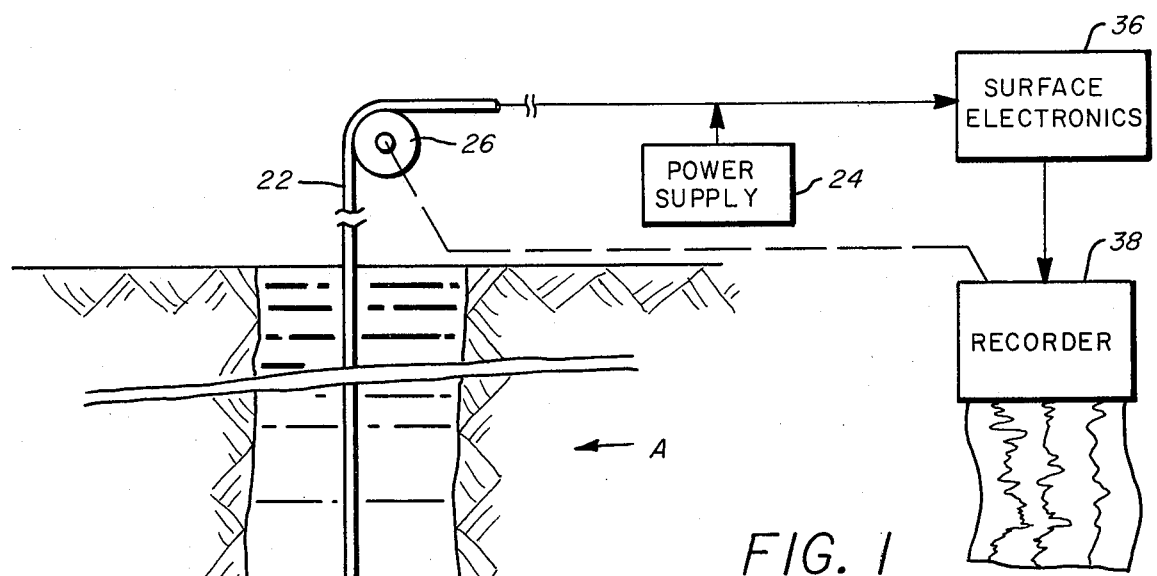
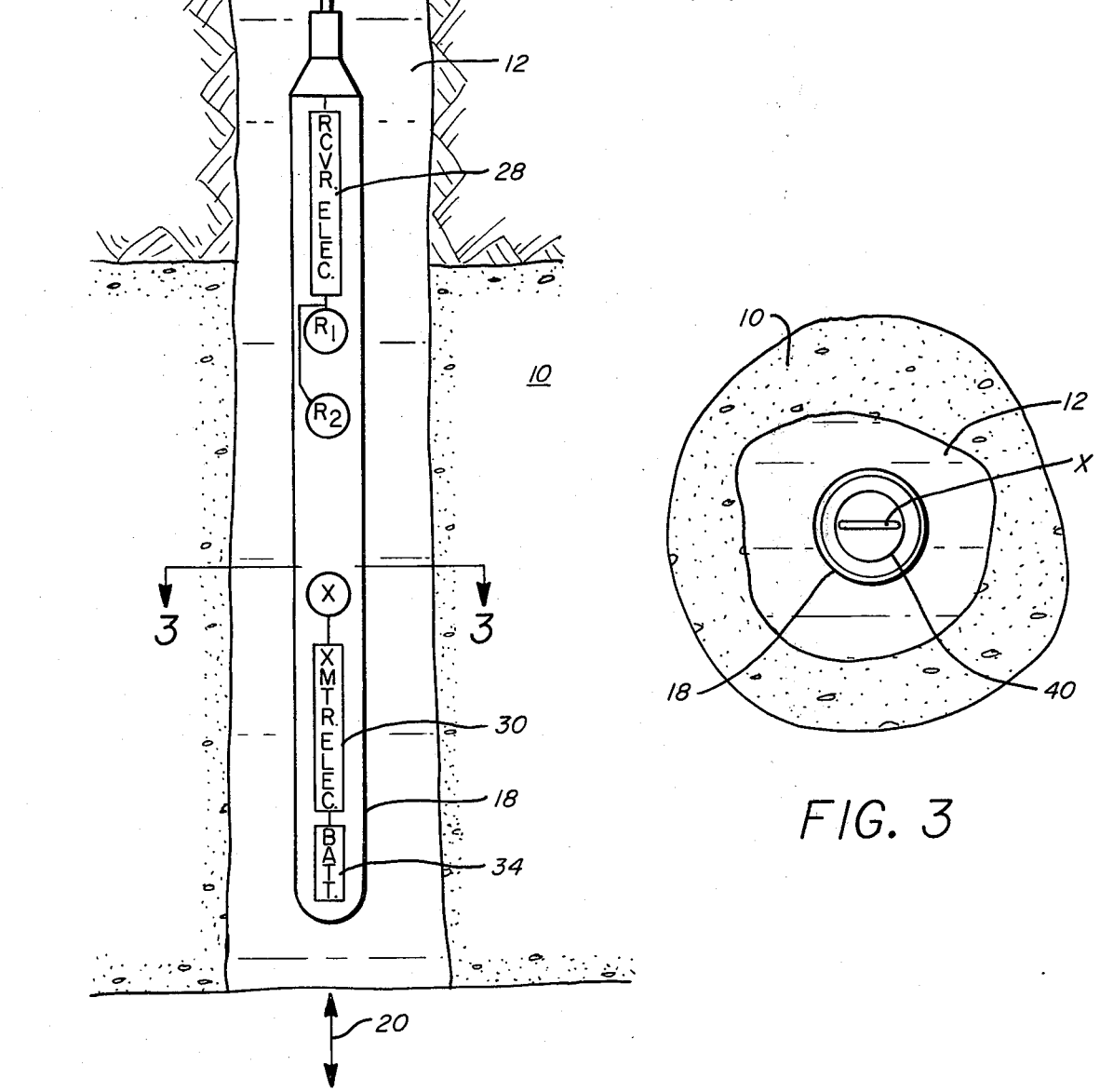
FIG. 1
FIG. 3

DIELECTRIC WELL LOGGING WITH RADIALLY ORIENTED COILS

BACKGROUND OF INVENTION

1. Field of Invention

The present invention relates to dielectric well logging.

2. Description of Prior Art

So far as is known to applicants, previous wave propagation well logging techniques which measured resistivity or resistivity and dielectric constant have employed source coils mounted with their longitudinal axis aligned with the longitudinal axis of the sonde. For analytical purposes, these sources were considered axial magnetic dipoles of infinitesmal extent. An axial magnetic dipole was adequate under conditions when a well borehole was small or when the borehole fluids were not very conductive. Where borehole fluids were conductive, however, eddy currents flowed in the borehole and caused significant signal reduction, so that signal amplitudes were low and variable. Low and variable signal amplitude caused inconsistency in log results, termed poor "repeats", and could in some cases result in a complete loss of information.

SUMMARY OF INVENTION

Briefly, the present invention is a dielectric well logging system which has a sonde which moves along its longitudinal axis in a well borehole for logging. Radio frequency energy is emitted from a source coil and detected in receiver coils. With the present invention, the coils are mounted on longitudinal axes transverse, preferably radially, the longitudinal axis of the sonde. A source coil arranged in this manner has a different response, since it is a different source, to the surrounding media and is less sensitive to borehole conditions. New and improved shielding for the coils is also provided.

BRIEF DESCRIPTION OF THE DRAWINGS

FIG. 1 is a schematic diagram, partly in cross-section, of a well logging system according to the present invention in a well borehole;

FIG. 3 is a cross-sectional view, not to scale, taken along the lines 3—3 of FIG. 1;

DESCRIPTION OF THE PREFERRED EMBODIMENT

Figure 2:
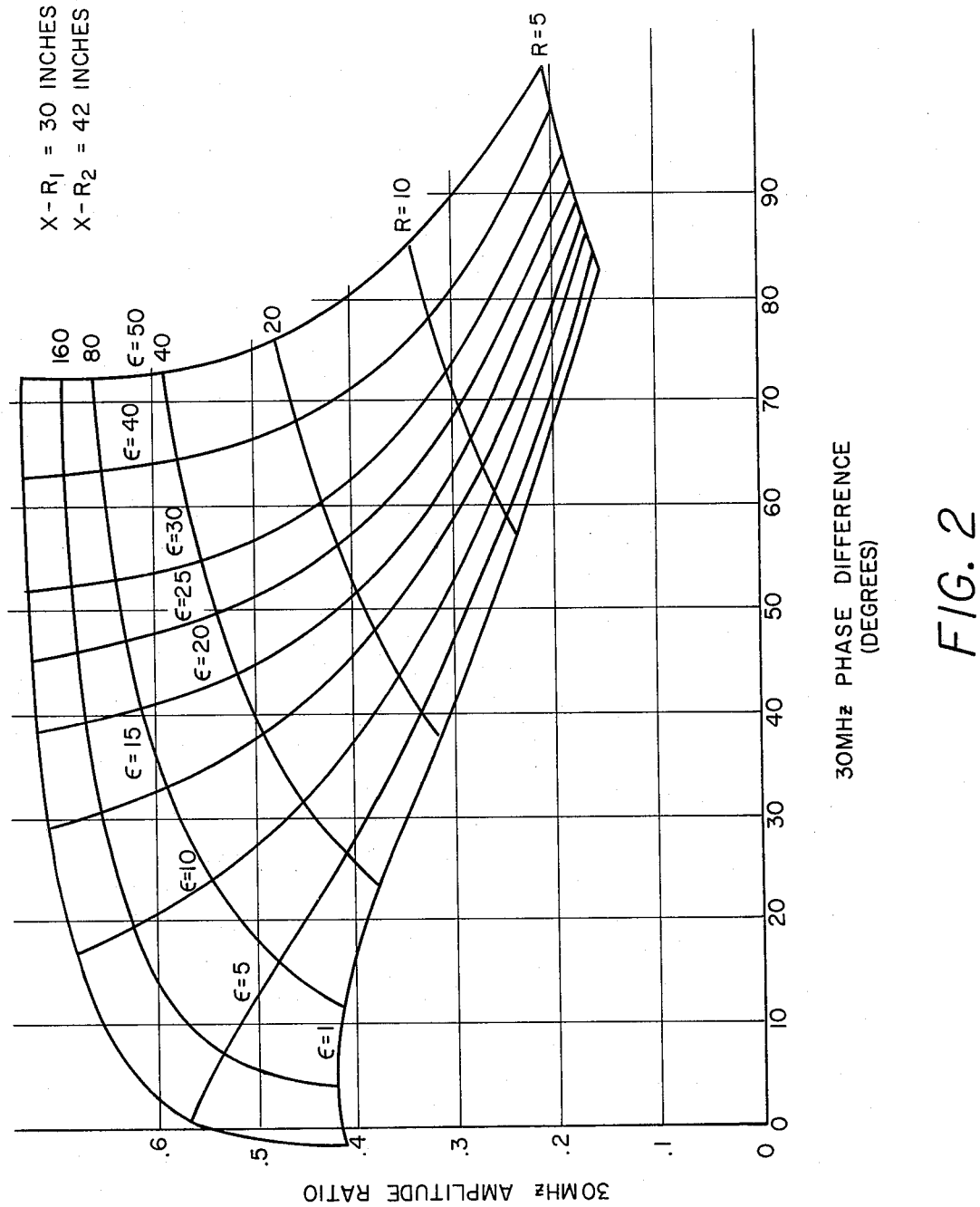
FIG. 2 is a plot of dielectric constants and resistivities as functions of amplitude and phase measurements made in radio frequency dielectric well logging.

In the drawings, the letter A designates generally a dielectric well logging apparatus according to the present invention for obtaining measurements of the resistivity and dielectric constant of subsurface formations 10 adjacent a well borehole 12. The apparatus A includes a transmitter coil X and at least two receiver coils $R_1$ and $R_2$ mounted in a sonde 18 made from a suitable material. The sonde 18 is moved through the borehole 12 along its longitudinal axis as indicated by a double-headed arrow 20 in response to movement of a wire line or cable 22.

The transmitter coils $R_1$ and $R_2$ receive operating electrical power from a power supply 24 at a surface location adjacent the well borehole 12 by means of the wire line or logging cable 22 which passes over a sheave wheel 26. Operating electrical power from the power supply 24 is provided to a receiver electronic circuit 28 from the wire line 22 so that the receiver coils $R_1$ and $R_2$ may sense radio frequency electromagnetic waves, typically in the range of from twenty to one hundred megahertz, when transmitted by the transmitter coil X. The receivers $R_1$ and $R_2$ are spaced from each other so that the emissions from the transmitter X typically have different amplitudes and phases which are used, as will be set forth, to determine the dielectric constant and resistivity of the formations adjacent the sonde 18 in the borehole 12.

The transmitter X is electrically connected to a transmitter electronics circuit 30 which causes the transmitter X to emit radio frequency electromagnetic waves for detection by coils $R_1$ and $R_2$. Operating electrical power for the transmitter electronic circuit 30 is preferably provided from suitable electrical batteries 32 in the sonde 18 rather than by conductors from power supply 24 by the wireline 22 in order to reduce the likelihood of radio frequency interference.

The received signals from coils $R_1$ and $R_2$ are converted in receiver electronics circuit 28 to a lower (intermediate) frequency and are sent from receiver electronics circuit 28 to the surface via the logging cable 22. At the surface the measurements of amplitude ratio ($A_{Long}/A_{short}$) and phase difference are made in a surface electronics unit 36. A suitable recorder or other display device 38 is electrically connected to the surface electronics unit 36 in order to provide an output indication of the processed results from the electronics unit 36 for use by an analyst or other person. The recorder 38 is further connected to the sheave wheel 26 so that the results may be plotted as a function of depth in the bore hole 12.

Figure 5:
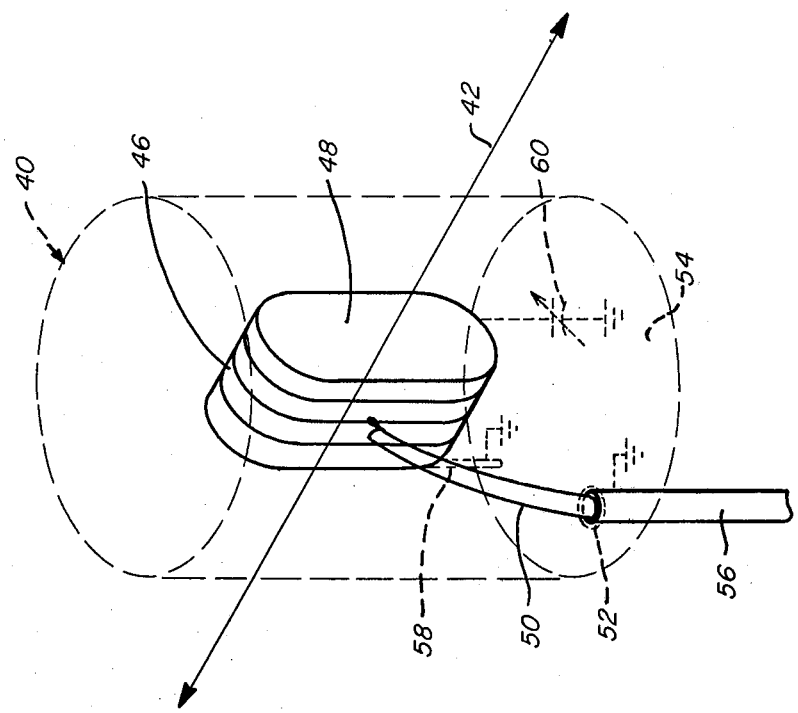
FIGS. 4 and 5 are isometric views of one of the coils of the well logging system of FIG. 1.
Figure 4:
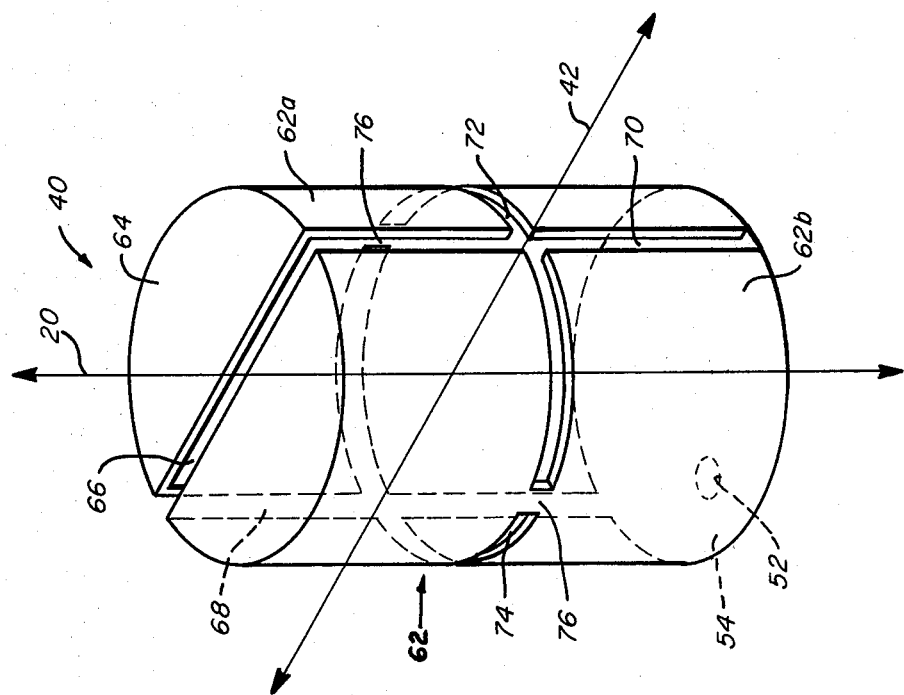

With the present invention, it has been found that the coils X and $R_1$ and $R_2$ may be adjusted in position in the sonde 18 with respect to the longitudinal axis 20 of the sonde 18 and less sensitivity of the apparatus A to borehole effects is noticed. Accordingly, each of the coils X, $R_1$ and $R_2$ is mounted within a shielding cannister or tubular member 40 (FIG. 4) so that their longitudinal axis extends radially, as indicated by an arrow 42, transversely through the longitudinal axis 20 of the sonde 18. Structural details of the shielding 40 are set forth in FIG. 4, while contents thereof are shown in FIG. 5 with shielding 40 shown schematically in phantom in FIG. 5 so as to preserve clarity in the drawings.

Within each of the shielding members 40, the coils X, $R_1$ and $R_2$ are each in the form of a suitable number of turns 46 of conductive wiring wound about a coil form 48 of a suitable material, such as the composition known as "alsimag". The turns 46 are electrically connected by means of a conductor 50 to the appropriate electronic circuits 34 and 28, as the case may be.

The conductor 50 extends through an opening formed in an end plate member 52 into a shielded conduit 56. The turns 46 of the coils are electrically connected to ground as indicated schematically at 58 and also through a tuning capacitor 60 to the end cap 54.

Considering now the shielding member 40 more in detail, a hollow tubular, preferably cylindrical, member 62 extends longitudinally coaxially with the axis 20 of the sonde and in connection with end cap members 54 and 64 forms a closure for the coils X, $R_1$ and $R_2$, as the case may be. The end plate 64 further has a transverse slot formed therein which is in alignment with the radial axis 42 of mounting of the coil in the shield member 40. A plurality of longitudinal slots 68 and 70 are formed in the tubular member 62 in alignment with the longitudinal axis 20 of the sonde 18. Further, a pair of circumferential slots 72 and 74 are formed about the periphery of the tubular member 62 at a mid portion thereof and extend between connector member 76 which separate an upper portion 62a from a lower portion 62b of the tubular member 62. The shield members 40 for the coils in the sonde 18 are preferably formed from a suitable conductive material to shield the coil therein, while the slots 64, 68, 70, 72 and 74 are formed in the shield members 40 to substantially reduce the likelihood of eddy currents which might otherwise improperly reduce the efficiency of the coils in transmitting or receiving radio frequency electromagnetic waves.

The magnetic field generated by a prior art axial dipole along the axis the longitudinal axis of a sonde is given by:

$$H_z = \frac{I}{2\pi\omega\mu} \left[ \frac{k}{z^2} + j\frac{1}{z^3} \right] e^{j(kz-\omega t)} \tag{1}$$

However, for a coil turned so that its longitudinal axis intersects radially the longitudinal axis 20 of the sonde 18, when the radial field of such a coil is examined, the field along the axis 20 of the sonde 18 (perpendicular to the axis 42 of the coil) becomes $$H_z = \frac{I}{4\pi\omega\mu} \left[ \frac{k}{z^2} + j\frac{1}{z^3} - j\frac{k^2}{z} \right] e^{j(kz-\omega t)} \tag{2}$$

Thus, where:
- $H_z$ = Magnetic field at distance z
- z = distance from axis
- I = output intensity of transmitter coil
- $\omega = 2\pi x$ frequency $$j = \sqrt{-1}$$

- $\mu$ = magnetic permeability of path
- k = wave number or propagation constant
- t = time The radially oriented coil according to the present invention thus has a different response to the surrounding media since it electromagnetically represents a different coil. The radial magnetic dipole source of the present invention operates in a similar manner to an electric dipole system and has bed response that is similar to a resistivity log using bucking electrodes, and is much less sensitive to borehole conditions.

In the operation of the present invention measurements are made in receiver electronics 30 of the radio frequency energy received at receiver coils $R_1$ and $R_2$. After transmission of these measurements via logging cable 22, phase difference and the amplitude ratio measurement are determined in surface electronics unit 36. The measurements are physical manifestations of results which might be calculated theoretically using Equation (2) with the distances $X - R_1 = Z_1$ and $X - R_2 = Z_2$ used in place of Z.

The actual physical measurements made can be mathematically regarded as complex numbers, $H_{zz}$ and $H_{z2}$, having a magnitude A and a phase $\theta$, where:

$$H_{z1} = A_{z1} e^{j\theta z_1} \text{ at } R_1 \tag{3}$$

and $$H_{z2} = A_{z2} e^{j\theta z_2} \text{ at } R_2. \tag{4}$$

with $z_1$ and $z_2$ serving as identifying subscripts in Equations 3 and 4.

From these measurements, an amplitude ratio and a phase difference are obtained as follows in the surface electronics 36:

$$A_{z2}/A_{z1} = \text{Amplitude ratio}, \tag{5}$$

and $$\theta_{z2} - \theta_{z1} = \Delta\theta \text{ (Phase Difference)} \tag{6}$$

The measurements of phase difference and amplitude ratio can be converted to resistivity and dielectric constant using the chart shown in FIG. 2. The data of FIG. 2 are obtained theoretically such as in a computer, by solving the Helmholtz wave Equation (2) as it relates to a propagating wave in formations having a number of various dielectric constants and resistivity values. Several of these values may be checked experimentally if desired, in a test borehole with an apparatus according to the present invention.

The foregoing disclosure and description of the invention are illustrative and exemplary thereof, and various changes in the size, shape and materials as well as in the details of the illustrated construction may be made within the scope of the appended claims without departing from the spirit of the invention.

We claim:

1. A dielectric well logging system having a sonde for movement along a longitudinal axis in a well borehole for emissions of radio frequency energy from a source coil and detection of such energy by at least two receiver coils spaced at different distances from said source coil, said system comprising:
   (a) each of said coils being mounted in said sonde with its longitudinal axis extending radially with respect to said longitudinal axis of said sonde; and
   (b) means for shielding said coils, comprising:
      (1) a hollow tubular member of conductive material for each of said coils;
      (2) an end plate of conductive material for closing each end of said tubular member to enclose one of said coils therein;
      (3) a slot formed in one of said end plates in alignment with the longitudinal axis of mounting of said coil enclosed in said tubular member;
      (4) a plurality of slots formed in said tubular member in alignment with said longitudinal axis of said sonde;
      (5) connector members separating an upper portion and a lower portion of said tubular member; and
      (6) a circumferential slot formed extending between said connector members about the periphery of said tubular member at said mid portion thereof.

2. The apparatus of claim 1, wherein said tubular member and said end plate are formed from copper.

3. In a dielectric well logging system having a sonde for movement along a longitudinal axis in a well borehole for emissions of radio frequency energy from a source coil and detection of such energy by receiver coils, each of said coils being mounted in said sonde with its longitudinal axis extending radially with respect to the longitudinal axis of said sonde, means for shielding said coils, comprising:

(1) a hollow tubular member of conductive material;

(2) an end plate of conductive material for closing each end of said tubular member to enclose one of said coils therein;

(3) a slot formed in one of said end plates in alignment with the longitudinal axis of mounting of said coils enclosed in said tubular member;

(4) a plurality of slots formed in said tubular member in alignment with said longitudinal axis of said sonde;

(5) connector members separating an upper portion and a lower portion of said tubular member; and (6) a circumferential slot formed extending between said connector members about the periphery of said tubular member at said mid portion thereof.

* * * * *